(12) United States Patent
Lian et al.

(10) Patent No.: US 11,774,410 B2
(45) Date of Patent: Oct. 3, 2023

(54) SMALL-DIAMETER WIRE/ROD/TUBE ULTRASONIC DETECTION SYSTEM WITHOUT END BLIND AREA

(71) Applicant: Institute of Metal Research, Chinese Academy of Sciences, Shenyang (CN)

(72) Inventors: Deliang Lian, Shenyang (CN); Ying Li, Shenyang (CN); Xusheng Zhang, Shenyang (CN); Haoran Hua, Shenyang (CN)

(*) Notice: Subject to any disclaimer, the term of this patent is extended or adjusted under 35 U.S.C. 154(b) by 408 days.

(21) Appl. No.: 16/980,839

(22) PCT Filed: Mar. 11, 2019

(86) PCT No.: PCT/CN2019/000053
§ 371 (c)(1),
(2) Date: Sep. 14, 2020

(87) PCT Pub. No.: WO2019/174368
PCT Pub. Date: Sep. 19, 2019

(65) Prior Publication Data
US 2021/0018472 A1    Jan. 21, 2021

(30) Foreign Application Priority Data

Mar. 15, 2018 (CN) .......................... 201810214938.1
Mar. 7, 2019 (CN) .......................... 201910172048.3

(51) Int. Cl.
*G01N 29/28* (2006.01)
*B07C 5/34* (2006.01)
(Continued)

(52) U.S. Cl.
CPC ............... *G01N 29/28* (2013.01); *B07C 5/34* (2013.01); *G01N 29/04* (2013.01); *G01N 29/225* (2013.01);
(Continued)

(58) Field of Classification Search
CPC ...... G01N 29/28; G01N 29/04; G01N 29/225; G01N 29/24; G01N 29/27; G01N 29/023;
(Continued)

(56) References Cited

U.S. PATENT DOCUMENTS 5,174,155 A * 12/1992 Sugimoto .............. G10K 11/16
73/644
8,418,562 B2 * 4/2013 Clossen-von Lanken Schulz ......
G01N 29/265
73/632

* cited by examiner

*Primary Examiner* — Suman K Nath
(74) *Attorney, Agent, or Firm* — Tsz Lung Yeung

(57) ABSTRACT

The present invention aims at providing a small-diameter wire/rod/tube ultrasonic detector with an end blind area and an automatic ultrasonic nondestructive detecting system, wherein a sealing cover of the ultrasonic detector is located on a water storage device; an annular array unit mounting rack and a water pump are fixed in the water storage device, and an annular array detecting unit is connected to the annular array unit mounting rack; the water pump is connected to an input end of water circulation input and output; a sensor is mounted in one side of the sealing cover in which a detected material is allowed to enter; the annular array detecting unit comprises an outer ring part and an inner ring part, and the outer ring part and the inner ring part are connected into a whole by means of a wire inlet side end cover and a wire outlet side end cover; the outer ring part consists of an outer ring substrate and an outer ring arraying probe, and the inner ring part consists of an inner ring inner core and an inner ring inner core locking ring. The ultrasonic detector in the present invention has unique "acoustic eye" structure characteristics, changes the mode of ultrasonic waves entering the detected material, and can effectively eliminate the end detection blind area of the wire/rod/tube.

19 Claims, 8 Drawing Sheets

(51) Int. Cl.
*G01N 29/04* (2006.01)
*G01N 29/22* (2006.01)
*G01N 29/24* (2006.01)
*G01N 29/27* (2006.01)

(52) U.S. Cl.
CPC ............ *G01N 29/24* (2013.01); *G01N 29/27* (2013.01); *G01N 2291/023* (2013.01); *G01N 2291/0289* (2013.01); *G01N 2291/106* (2013.01); *G01N 2291/2626* (2013.01)

(58) Field of Classification Search
CPC ..... G01N 2291/0289; G01N 2291/106; G01N 2291/2626; B07C 5/34
See application file for complete search history.

SMALL-DIAMETER WIRE/ROD/TUBE ULTRASONIC DETECTION SYSTEM WITHOUT END BLIND AREA

CROSS REFERENCE OF RELATED APPLICATION

This application claims the benefit under 35 U.S.C. § 119 from International Application No. PCT/CN 2019/000053, which claims priorities to CN 201810214938.1, filed Mar. 15, 2018 and CN 201910172048.3, filed Mar. 9, 2019.

BACKGROUND OF THE PRESENT INVENTION

Field of Invention

The present invention relates to wire/rod/tube non-destructive detection technology, and provides a small-diameter wire/rod/tube ultrasonic detector without end blind area and an automated ultrasonic non-destructive detecting system.

Description of Related Arts

In the fields of aviation, aerospace, nuclear industry, special equipment and medical treatment, wire/rod/tube is widely used as the basic raw material. If the wire/rod/tube has cracks, inclusions and other defects, it will seriously affect the safety of the product and cause serious consequences. Ultrasonic detecting method is generally one of the methods that must be used in the product quality detecting methods, and most of the detection of large quantities of the material to be detected employ automatic detection method.

All wire/rod/tube detecting systems have a common problem at present, that is, the problem of end blind area. The equipment manufacturing standard YB4082 stipulates: "The undetectable area of the tube end (end blind area) is not more than 200 mm". The detecting method standard GB5777 stipulates: "The two ends of the steel tube will not be effectively detected during automatic detection. The area is regarded as a blind area of automatic detection. The manufacturer can adopt effective methods to ensure the quality of the area." Aiming at the end detection blind area, one method adopted by the manufacturer of the wire/rod/tube is to cut off the end, which causes a huge waste of the raw materials; another method is to rely on the manufacturing process to ensure it, which is bound to leave a safety hazard.

Ultrasonic detectors used for system integration can be divided into the form of ultrasonic probe mechanical rotation, ultrasonic phased array electronic rotation, and multi-channel detecting unit (ZL 2010 1 0146128.0), etc. All of the ultrasonic detectors mentioned above comprise a water coupling cavity and coupling sleeves on both sides of the water coupling cavity, wherein the water cavity is used to define ultrasonic coupling medium, and the coupling sleeves on both sides are used to limit the material to be detected. In actual detection, it can be considered that when the material to be detected is located between the two coupling sleeves, the relative position of the material to be detected and the probe is stable, and a reliable ultrasonic signal can be obtained. When the tail of the material to be detected leaves the coupling sleeve of the tail, the relative position of the material to be detected and the probe cannot be confirmed, and the reliable and stable ultrasonic signal cannot be obtained, an end detection blind area is formed. That is to say, a half of the distance between the two coupling sleeves is the end detection blind area. The two ultrasonic detectors, ultrasonic probe mechanical rotation form and ultrasonic phased array electronic rotation form, are generally larger in size, and the end blind area is also larger. OLYMPUS's BIS rod detecting system is optimized aiming at end detection, which can obtain very short end, but the un-measurable length is still 20 mm. The multi-channel detecting unit provided by ZL201010146128.0 has a small size, which can greatly reduce the detection blind area at both ends of the material to be detected. In terms of its principle, it cannot eliminate the detection blind area fundamentally.

In terms of the material to be detected movement, the in and out of the material to be detected are mostly driven by roller friction. This friction driving method is prone to loss of rotation or slippage, and the speed control is not accurate enough; for the material to be detected with different diameters, the height of multiple driving wheels needs to be adjusted to ensure centering, the operation process is cumbersome and the efficiency is low. For the material to be detected with non-circular cross-sectional shapes, such as square rods, six-sided rods, etc., corresponding rollers need to be designed and manufactured according to specifications, which is poor in versatility.

The present invention provides a small-diameter wire/rod/tube automated ultrasonic non-destructive detecting system without end blind area, wherein the material to be detected accurately enters an ultrasonic detector by clamping conveying, and passes the ultrasonic detector at high speed by high-speed clamping traction, and a lift-drop sorting mechanism completes the automatic sorting, which can effectively eliminate the detection blind areas of a starting end and an ending end of the material to be detected, and realize high-speed automatic detection.

SUMMARY OF THE PRESENT INVENTION

The object of the present invention is to provide a small-diameter wire/rod/tube ultrasonic detector without end blind area and an automated ultrasonic non-destructive detecting system. Wherein, the ultrasonic detector has "acoustic eye" structure characteristics. Compared with the existing ultrasonic detectors, it changes the mode of ultrasonic waves entering the material to be detected and can effectively eliminate the end detection blind area of the wire/rod/tube. And the ultrasonic detecting system integrated with an electromechanical system adopts the mode of linear transmission of the material to be detected, which can realize the small-diameter wire/rod/tube direct-entry fast ultrasonic non-destructive detection without the blind area.

The technical proposal of the present invention is as follows:

A small-diameter wire/rod/tube ultrasonic detector without end blind area, wherein, the ultrasonic detector 3 comprises a water storage device 31, a sealing cover 32, an annular array unit mounting rack 33, an annular array detecting unit 34, a water pump 35, water circulation input and output 36 and a sensor 37; wherein the sealing cover 32 is located on the water storage device 31; the annular array unit mounting rack 33 and the water pump 35 are fixed inside the water storage device 31, and the annular array detecting unit 34 is connected to the annular array unit mounting rack 33; the water pump 35 is connected to an input end of the water circulation input and output 36; the sensor 37 is mounted an outside of the sealing cover 32 where the material to be detected enters, for determining the positions of the head portion and the tail portion of the material to be detected; the annular array detecting unit 34 comprises an outer ring part and an inner ring part, and the outer ring part and the inner ring part are connected into a whole by a wire inlet side end cover 345 and a wire outlet side end cover 346; the outer ring part consists of an outer ring substrate 341 and a plurality of outer ring arraying probes 342, and the inner ring part consists of an inner ring inner core 343 and an inner ring inner core locking ring 344; the sealing cover 32 is provided with an opening, for leading out the connection ports of the outer ring arraying probe 342 and the water pump 35.

The outer ring substrate 341 is a ring body, the probe mounting holes are arranged to define a multi-row circular array at an outer cylindrical surface of the ring, and an inner hole of the ring cooperates with the wire inlet side end cover 345 and the wire outlet side end cover 346 to form a coupling water cavity; the outer ring arraying probes 342 are placed in the probe mounting holes successively; the inner ring inner core 343 is disposed at a central portion of the coupling water cavity, and the inner ring inner core 343 is a cylindrical member, and the hole-shaped or strip-shaped "acoustic eyes" are arranged along the outer cylindrical surface in accordance with the multi-row circular array, the "acoustic eyes" are aligned with the axes of the probe mounting holes respectively; a cylindrical inner hole of the inner ring inner core 343 is the moving channel for the material to be detected; the inner ring inner core 343 passes through the wire inlet side end cover 345 and the wire outlet side end cover 346 successively, and is fixed at the wire inlet side end cover 345 or the wire outlet side end cover 346 by the inner ring inner core locking ring 344.

The outer ring arraying probes 342 are fixed in the probe mounting hole by outer ring probe adjusting locking screws.

The outer ring substrate 341 is a ring body made of high-density organic glass material, and the inner ring inner core 343 is made of copper, aluminum, stainless steel, hard alloy or polytetrafluoroethylene.

The ultrasonic detector of the present invention is an integrated design, which can be easily and quickly integrated with various ultrasonic transmitting and receiving devices and electromechanical systems to realize high-speed automatic detection.

The present invention also provides a small-diameter wire/rod/tube ultrasonic detecting system without end blind area, wherein the ultrasonic detecting system comprises an automatic clamping input mechanism 1, an operation control platform 2, an ultrasonic detector 3, an ultrasonic signal processing unit 4, a traction output sorting mechanism 5; wherein the operation control platform 2 carries the ultrasonic detector 3 and the ultrasonic signal processing unit 4, and its left and right sides are connected with the automatic clamping input mechanism 1 and the traction output sorting mechanism 5; the ultrasonic detector 3 and the ultrasonic signal processing unit 4 are respectively used for transmitting and receiving ultrasonic waves and processing and displaying defect information; the automatic clamping input mechanism 1 is used for loading the material to be detected into the ultrasonic detector 3 and the real-time detection of the end area of the material to be detected, the traction output sorting mechanism 5 is used to drive the material to be detected through and out of the ultrasonic detector 3 to realize the real-time detection of the main area and the tail portion area of the material to be detected, and automatically sort according to the defect situation; the automatic clamping input mechanism 1 comprises a loading rack frame 11 and an automatic loading mechanism frame 14, and a loading rack 12 is disposed above the loading rack frame 11 through a height adjusting mechanism 13, wherein, the loading rack 12 is provided with one or more supporting portions for supporting the material to be detected, wherein the height adjusting mechanism 13 can adjust the height of the loading rack 12 for the placement of the material to be detected and the adjustment of the centering; the automatic loading mechanism frame 14 is located on the left side of the loading rack frame 11, and it is provided with a loading moving unit 15 and a loading centering device 17, and a loading clamping mechanism 16 is disposed on the loading moving unit 15 for clamping the material to be detected, wherein the loading moving unit 15 can drive the loading clamping mechanism 16 to move horizontally for automatically clamping loading the material to be detected during the detecting process; the traction output sorting mechanism 5 comprises a discharging mechanism frame 51 and a supporting sorting mechanism 56, wherein the discharging mechanism frame 51 is provided with a discharging traction mechanism and a discharging clamping mechanism 55, wherein the discharging traction mechanism is disposed on the discharging mechanism frame 51 for driving the discharging clamping mechanism 55 to move horizontally; a plurality of supporting sorting mechanisms 56 are disposed on the discharging mechanism frame 51 for supporting and automatic sorting of the material to be detected during the detecting process; both sides of the discharging mechanism frame 51 are respectively provided with a discharging unqualified area rack 57 and a discharging qualified area rack 58 for placing qualified and unqualified detected material after sorting.

As a preferred technical proposal:

The supporting sorting mechanism 56 comprises a supporting sorting mechanism frame 561, a supporting sorting mechanism control box 562, a lifting mechanism cylinder 563, a lifting bracket 564, a clamping cylinder 565, a clamping mechanism 566, a qualified sorting cylinder 567, an unqualified sorting cylinder 568 and a sorting pallet 569; wherein the supporting sorting mechanism frame 561 is connected to the discharging mechanism frame 51, the supporting sorting mechanism control box 562 is provided with one side of the supporting sorting mechanism frame 561 for the electrical control of the supporting sorting mechanism 56, and the lifting mechanism cylinder 563 is provided with another side of the supporting sorting mechanism frame 561; the U-shaped lifting bracket 564 is connected in the telescopic direction of the lifting mechanism cylinder 563, the clamping cylinder 565 and the clamping mechanism 566 are connected above the lifting bracket 564, and the clamping mechanism 566 consists of a bracket and three rollers, which supports and centers the material to be detected during the detecting process; both sides of the lifting bracket 564 are respectively provided with the qualified sorting cylinder 567 and the unqualified sorting cylinder 568, wherein the qualified sorting cylinder 567 and the unqualified sorting cylinder 568 are respectively connected with one "L-shaped" sorting pallet 569, which is used for sorting qualified and unqualified detected material, wherein the installation direction of the two sorting pallets 569 is mirrored, when they are raised at the same time, they can support and fix the material to be detected, and the long edge of the sorting pallet 569 is at a certain angle (such as 10°-30°) to the horizontal, so that when it is raised on a single side, the material to be detected can naturally slide down onto the corresponding rack. During the movement of the material to be detected, the lifting bracket 564 of each supporting sorting mechanism 56 are lifted up successively, so that the corresponding clamping mechanism 566 is in a clamping state, which supports and limits the material to be detected; after the material to be detected stops moving, the clamping mechanism 566 is opened firstly, and then the qualified sorting cylinder 567 and the unqualified sorting cylinder 568 are raised at the same time, so that the detected material is supported and fixed by the sorting pallet 569. According to the condition of the defect, if the detected material is qualified, the unqualified sorting cylinder 568 will drop down, and the detected material will naturally slide down onto the discharging qualified area rack 57 through the sorting pallet 569 on the qualified sorting cylinder 567, finally, the sorting is over, the lifting mechanism cylinder 563 and the qualified sorting cylinder 567 drop down at the same time, and vice versa.

The discharging traction mechanism consists of a discharging mechanism guide rail 52, a discharging mechanism toothed rack 53 and a discharging moving unit 54, wherein the discharging mechanism guide rail 52 is laid on the discharging mechanism frame 51, wherein the discharging moving unit 54 is disposed on the discharging mechanism guide rail 52 and is driven to move by the discharging mechanism toothed rack 53, wherein the discharging clamping mechanism 55 is disposed on the discharging moving unit 54.

The loading rack frame 11, the automatic loading mechanism frame 14, the ultrasonic detector 3, and the discharging mechanism frame 51 are connected and fixed by connecting plates and fastening screws, wherein the ultrasonic detector 3 can be integrated with other automation systems, wherein the automatic clamping input mechanism 1 and the traction output sorting mechanism 5 can also be integrated with other detectors.

The loading centering device 17 consists of a height-adjustable bracket and a supporting roller.

The diameter of the material to be detected is 4 mm-28 mm, and the material to be detected is wire/rod/tube with a circular end surface or a regular geometric shape.

The small-diameter wire/rod/tube ultrasonic detecting system without end blind area of the present invention can realize the automatic detection without blind area and automatic sorting.

The advantages of the present invention:

(1) The ultrasonic detecting system of the present invention can effectively eliminate end detection blind area of the wire/rod/tube, guarantee the test quality of the entire the material to be detected, solves the problem of cutting the end caused by the ineffective detection of the end of the material to be detected, avoids the loss of manpower and material resources caused by cutting off the end of the material to be detected, and greatly reduces the production cost.

(2) The ultrasonic detecting system of the present invention provides a good solution for small-diameter wire/rod/tube high-speed automated ultrasonic detection. Compared with the spiral detecting method, the direct-entry detecting method of the present invention greatly improves the detection speed; the full-process automatic design of automatic loading, automatic discharging and automatic sorting simplifies the detecting process and ensures the realization of the rapid and high-reliability detection.

DETAILED DESCRIPTION OF THE PREFERRED EMBODIMENT

Embodiment 1

Figure 5:
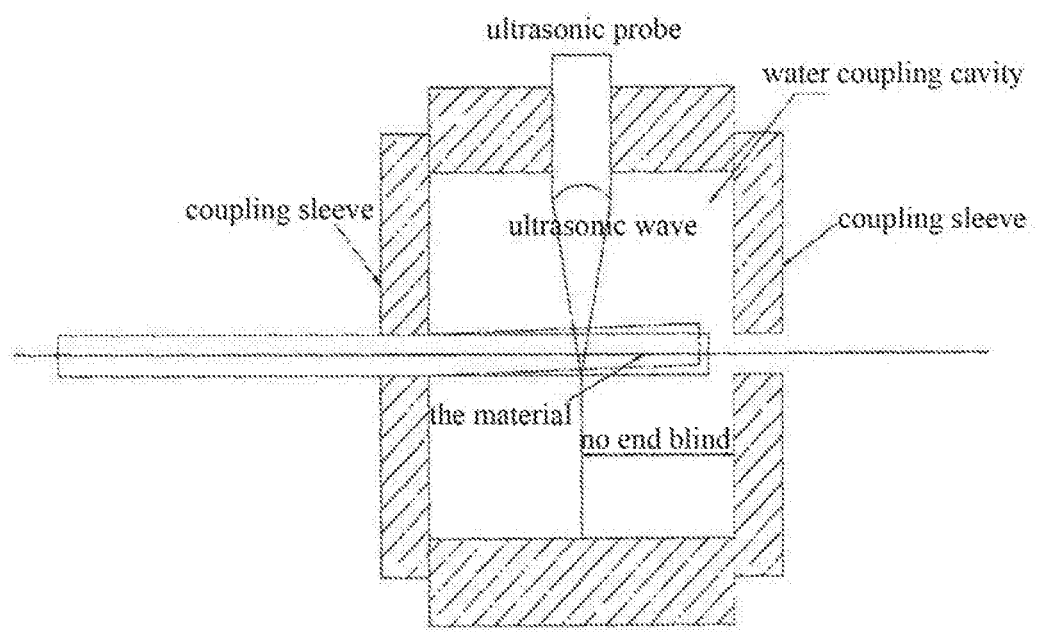
FIG. 5 is a basic schematic diagram of an existing ultrasonic detector.

As shown in FIG. 5, in the existing ultrasonic detectors, the ultrasonic probe and the material to be detected are coupled and propagated in an "open" water environment. When the material to be detected reaches the unconstrained area of the water coupling cavity, the end position of the material to be detected will inevitably swing mechanically, and the stable ultrasonic detection signal cannot be obtained, and the effective detection cannot be implemented.

Figure 6:
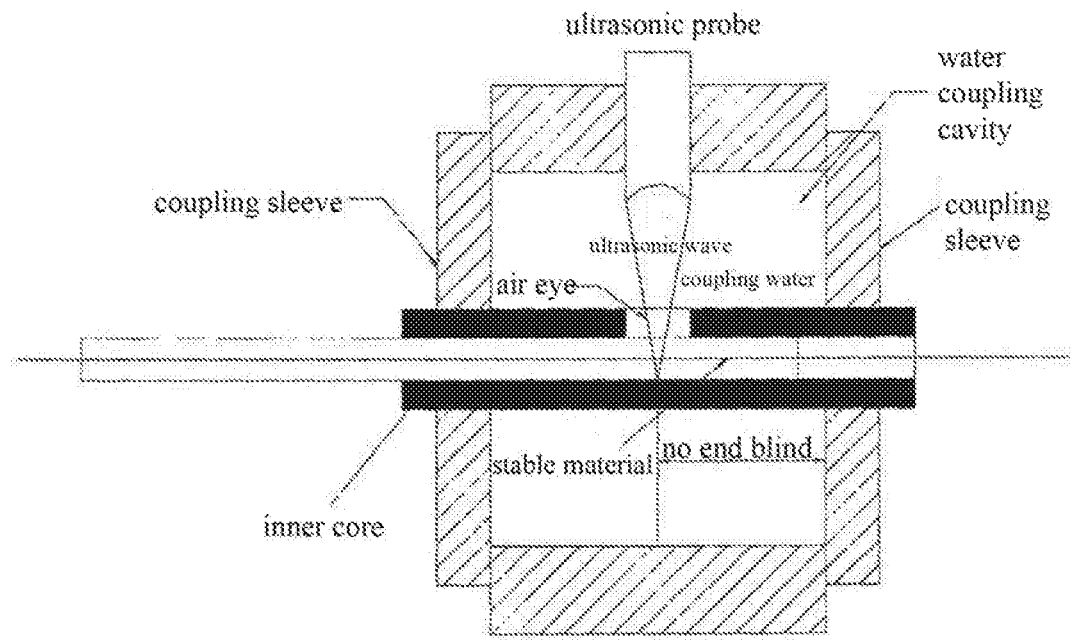
FIG. 6 is a basic schematic diagram of an ultrasonic detector without end blind area.

As shown in FIG. 6 is a basic schematic diagram of a direct-entry ultrasonic detector without blind area of the present invention. Through the design and use of an inner core, the ultrasonic probe and the material to be detected are coupled and propagated in an "isolated" environment, wherein the acoustic beam of the ultrasonic probe enters the material to be detected through an "acoustic eye", and the material to be detected moves stably under the constraints of the inner core. Even at the end position, stable transmission and stable ultrasonic detection signals can be obtained. Therefore, the present invention realizes end "no blind area" detection.

Figure 7:
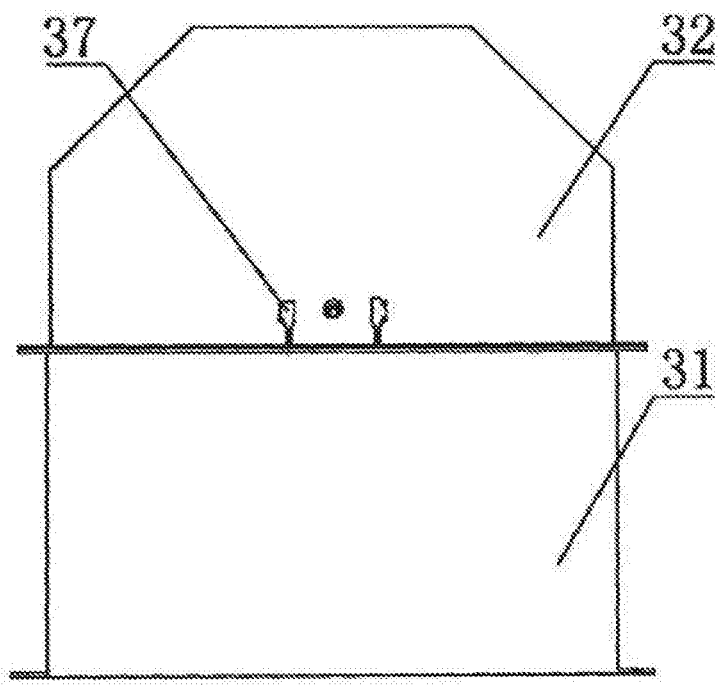
FIG. 7 is a side view of an overall structure of the ultrasonic detector.
Figure 8:
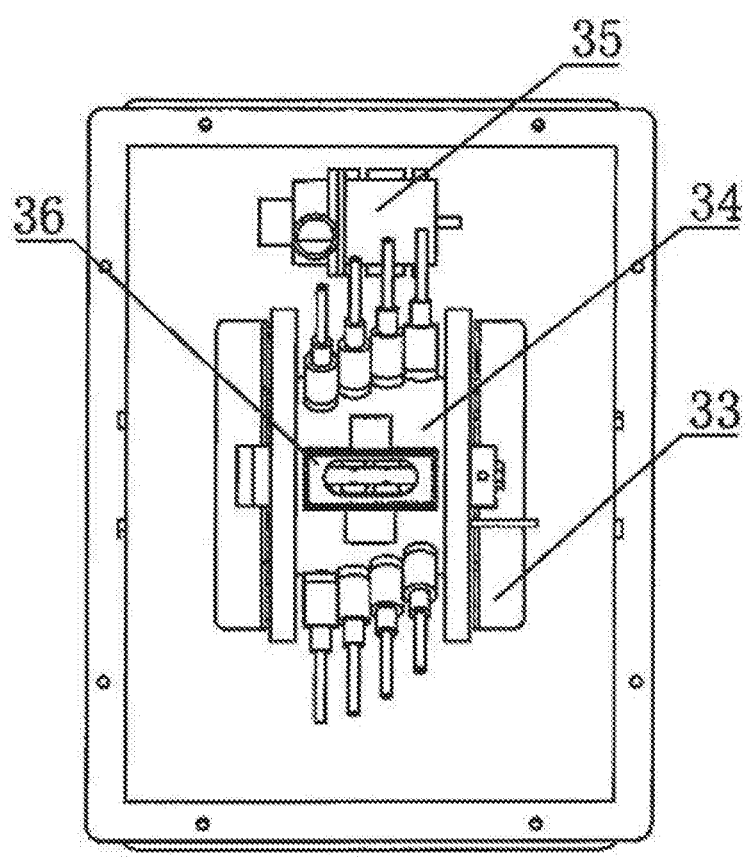
FIG. 8 is a top view of the overall structure of the ultrasonic detector.

As shown in FIGS. 7 and 8, the ultrasonic detector 3 comprises a water storage device 31, a sealing cover 32, an annular array unit mounting rack 33, an annular array detecting unit 34, a water pump 35, water circulation input and output 36 and a sensor 37; wherein the sealing cover 32 is located on the water storage device 31, and the sealing cover 32 has an opening for leading out the connection ports of a plurality of outer ring arraying probes 342 and the water pump 35; the annular array unit mounting rack 33 is fixed on a bottom plate of the water storage device 31 by welding, the water pump 35 is fixed on the bottom plate of the water storage device 31 through screw connection, and the annular array detecting unit 34 is connected to the annular array unit mounting rack 33 through screws; the water pump 35 is connected to an input end of the water circulation input and output 36 through one water pipe, and an output end of the water circulation input and output 36 is connected to another water pipe to complete the connection of the water circulation system; the sensor 37 is mounted in the sealing cover 32 on the side where the material to be detected enters, for determining the position of the head portion and the tail portion of the material to be detected.

Figure 9:
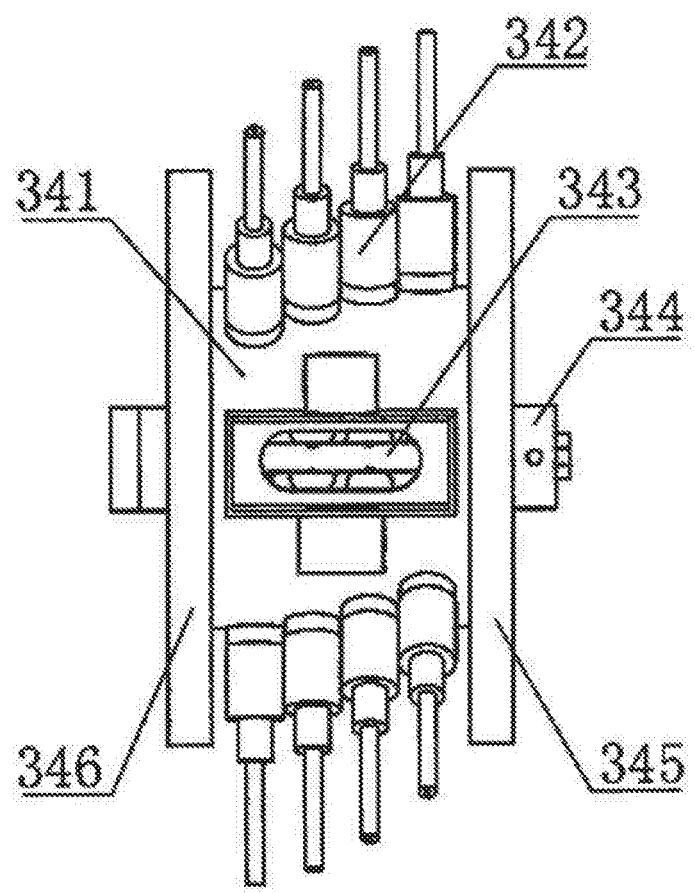
FIG. 9 is a structure diagram of an annular array detecting unit.

As shown in FIG. 9, the annular array detecting unit 34 comprises an outer ring part and an inner ring part, and the outer ring part and the inner ring part are connected into a whole by a wire inlet side end cover 345 and a wire outlet side end cover 346; the outer ring part consists of an outer ring substrate 341 and a plurality of outer ring arraying probes 342 distributed regularly, and the inner ring part consists of an inner ring inner core 343 and an inner ring inner core locking ring 344.

The outer ring substrate 341 is a ring body, the outer cylindrical surface of the ring is arranged with probe mounting holes to define a multi-row circular array, and an inner hole of the ring cooperates with the wire inlet side end cover 345 and the wire outlet side end cover 346 to form a coupling water cavity; the outer ring arraying probes 342 are fixed in probe mounting holes successively by outer ring probe adjusting locking screws, the number of the probes should ensure the acoustic coverage of the material to be detected; the inner ring inner core 343 is disposed in a central portion of the coupling water cavity, and the inner ring inner core 343 is a cylindrical member, which penetrates through a center hole of the wire inlet side end cover 345, and then passes through a center hole of the wire outlet side end cover 346, the inner ring inner core locking ring 344 locks and fixes the inner ring inner core 343 at the wire inlet side end cover 345; the inner ring inner core 343 is provided with hole-shaped through holes—"acoustic eyes", which are arranged along the outer cylindrical surface in accordance with the multi-row circular array structure, wherein the "acoustic eye" corresponds to the axis of the probe mounting hole; a cylindrical inner hole of the inner ring inner core 343 is the moving channel for the material to be detected; the ultrasonic beam arrives at the surface of the material to be detected through the "acoustic eye" in the coupling water cavity, and then spreads and detects inside the material to be detected; the upper side of the inner ring inner core 343 is also provided with a series of hole-shaped or strip-shaped "air eyes", wherein the "air eye" is a passage with a diameter of about 3 mm, which is located above the inner ring inner core 343 in the coupling water cavity (that is, the "air eye" is a passage in the wall of the inner ring inner core 343), and its axial position is located in the entry direction of the material to be detected and more than 5 mm away from the first acoustic eye, for discharging the gas in the moving channel for the material to be detected.

The outer ring substrate 341 is a ring body made of high-density organic glass material, and the inner ring inner core 343 is a cylindrical member made of copper.

Embodiment 2

The difference from Embodiment 1 is that the "acoustic eyes" are strip-shaped through holes arranged on the outer cylindrical surface of the inner ring inner core 343, and other parts and expected results are the same as Embodiment 2.

Embodiment 3

The difference from Embodiment 1 is that the "acoustic eyes" are hole-shaped and strip-shaped through holes arranged on the outer cylindrical surface of the inner ring inner core 343, and other parts and expected results are the same as Embodiment 2.

Embodiment 4

The difference from Embodiment 1 is that the inner ring inner core 343 is a cylindrical member made of stainless steel, and other parts and expected results are the same as Embodiment 2.

Embodiment 5

Figure 10:
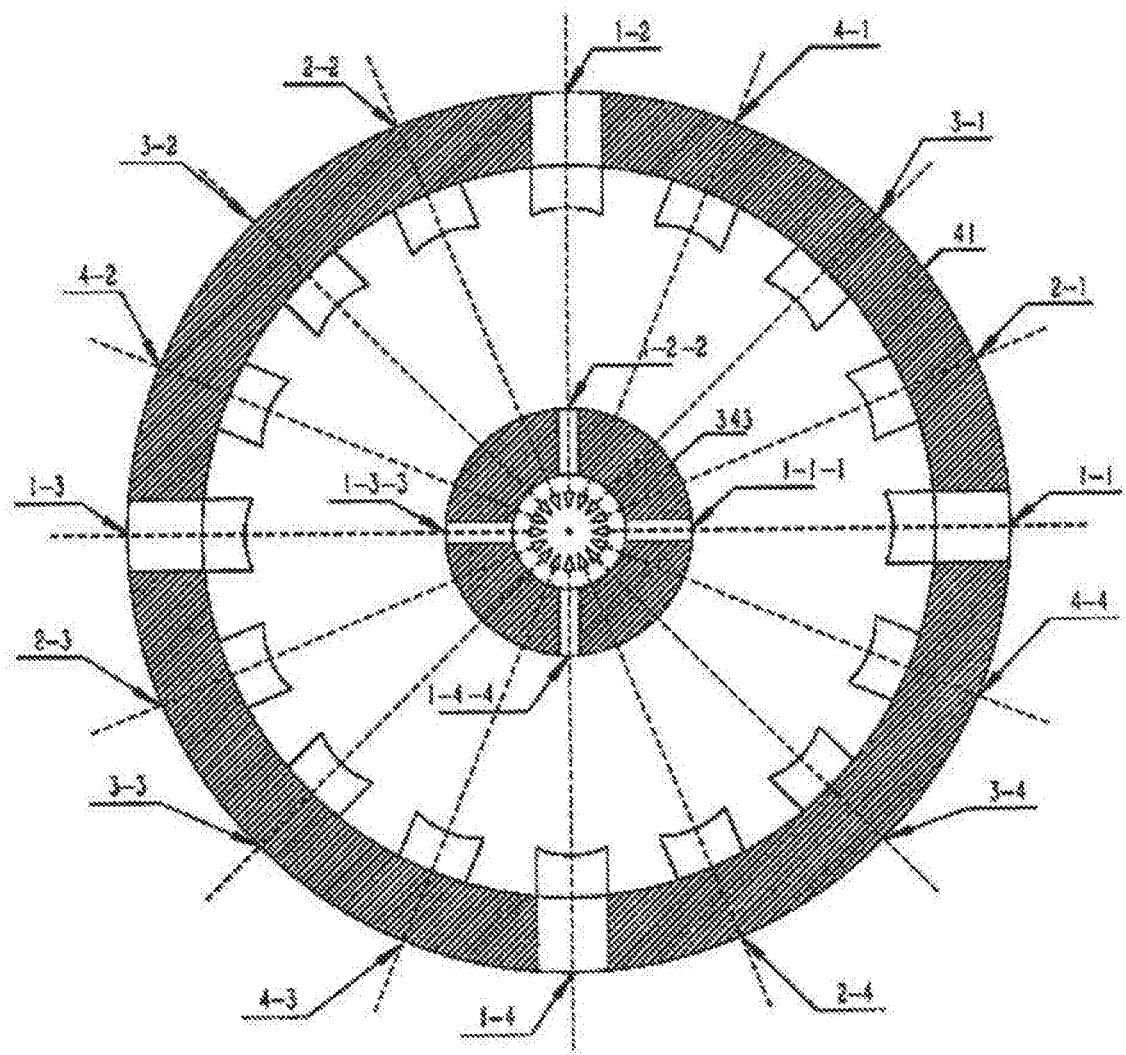
FIG. 10 is an arrangement diagram of annular arraying probes.

For the detecting method of the material to be detected linear transmission, in order to ensure 100% coverage of the material to be detected by the acoustic beam, it is necessary to implement the arrangement of multiple probes in a limited space. The idea of "outer ring-multiple rings and multiple probes, inner core-multiple rings and multiple acoustic eyes" is adopted. FIG. 10 shows the arrangement form of the probes of "outer ring-4 rings and 16 probes, inner core-4 rings and 16 acoustic eyes". According to the requirements of the acoustic beam coverage, 4 rings of probes are arranged in the outer ring totally, with 4 probes distributed at 90° intervals in each ring. The probes of a first ring are respectively the probe 1-1, the probe 1-2, the probe 1-3 and the probe 1-4. The acoustic eye 1-1-1, the acoustic eye 1-2-2, the acoustic eye 1-3-3 and the acoustic eye 1-4-4 are correspondingly arranged on the inner ring inner core 343. The probes of a second ring are arranged at a certain interval along the axial direction of the material to be detected, which are respectively the probe 2-1, the probe 2-2, the probe 2-3 and the probe 2-4. Four acoustic eyes are correspondingly arranged on the inner ring inner core 343 along the axial direction. By analogy, the probes of a third ring are respectively the probe 3-1, the probe 3-2, the probe 3-3 and the probe 3-4, the probes of a fourth ring are respectively the probe 4-1, the probe 4-2, the probe 4-3 and the probe 4-4. In this embodiment, a total of 4 rings 16 probes and 4 rings 16 acoustic eyes are arranged to ensure the coverage of the acoustic beam of the material to be detected. According to the actual needs of the number of probes, the arrangement form of "outer ring-N rings M probes, inner core-N rings M acoustic eyes" can be flexibly adopted to realize direct transmission detection without blind area.

Embodiment 6

Figure 1:
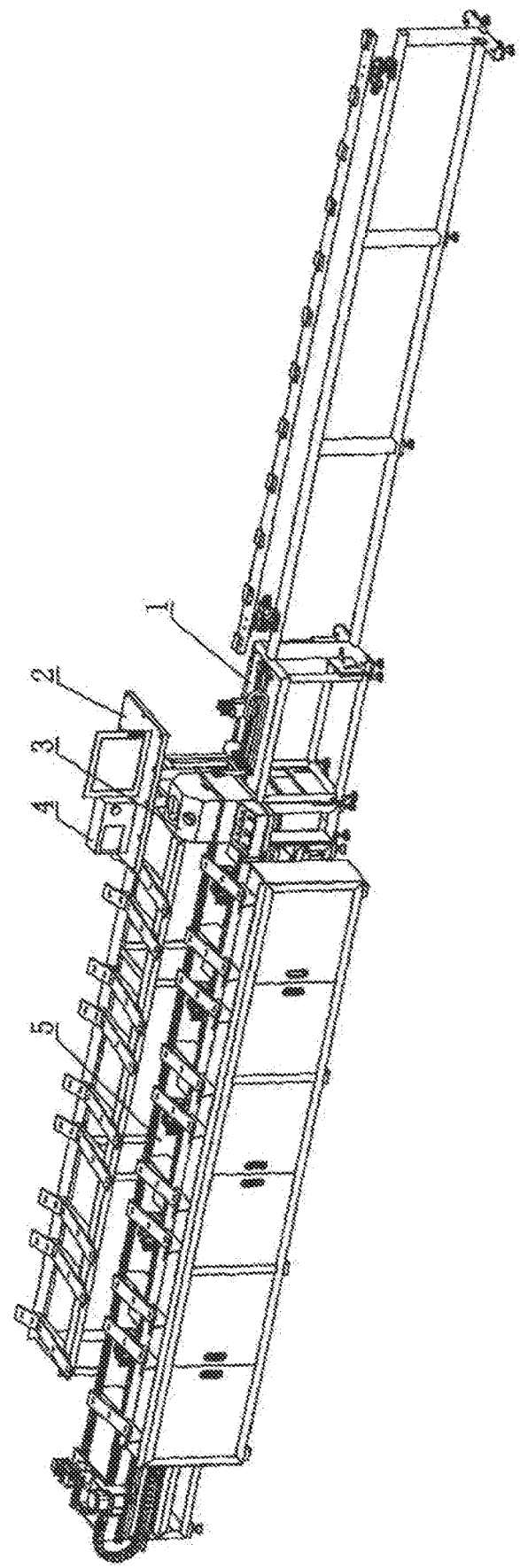
FIG. 1 is an overall structure diagram of the device.

As shown in FIG. 1, a small-diameter wire/rod/tube ultrasonic detecting system without end blind area, comprises an automatic clamping input mechanism 1, an operation control platform 2, an ultrasonic detector 3, an ultrasonic signal processing unit 4, a traction output sorting mechanism 5; wherein, the operation control platform 2 carries the ultrasonic detector 3 and the ultrasonic signal processing unit 4, and its left and right sides are connected with the automatic clamping input mechanism 1 and the traction output sorting mechanism 5; the ultrasonic detector 3 and the ultrasonic signal processing unit 4 are respectively used for transmitting and receiving ultrasonic waves and processing and displaying defect information; the automatic clamping input mechanism 1 is used for feeding the material to be detected into the ultrasonic detector 3 and the real-time detection of the end area of the material to be detected, the traction output sorting mechanism 5 is used to drive the material to be detected through and out of the ultrasonic detector 3 to realize the real-time detection of the main area and the tail portion area of the material to be detected, and automatically sort according to the defect situation.

The control system of the ultrasonic detecting system comprises an industrial control computer, a power supply and general control unit, a motion control and drive unit, a clamping control unit and five supporting sorting mechanism control units, wherein each control unit is provided with a programmable controller, which forms a bus structure with the industrial control computer, and the detection software of the industrial control computer realizes the control of the entire detecting process. At the beginning of the detection, the material to be detected penetrates into the ultrasonic detector 3 under the clamping towing of the automatic clamping input mechanism 1. After the head end passes through, the automatic clamping input mechanism 1 stops, and the material to be detected continues to pass through the ultrasonic detector 3 under the towing of the traction output sorting mechanism 5 until the material to be detected is completely penetrated, wherein the traction output sorting mechanism 5 performs qualified or unqualified sorting according to the detection result of the ultrasonic signal processing unit 4.

Figure 2:
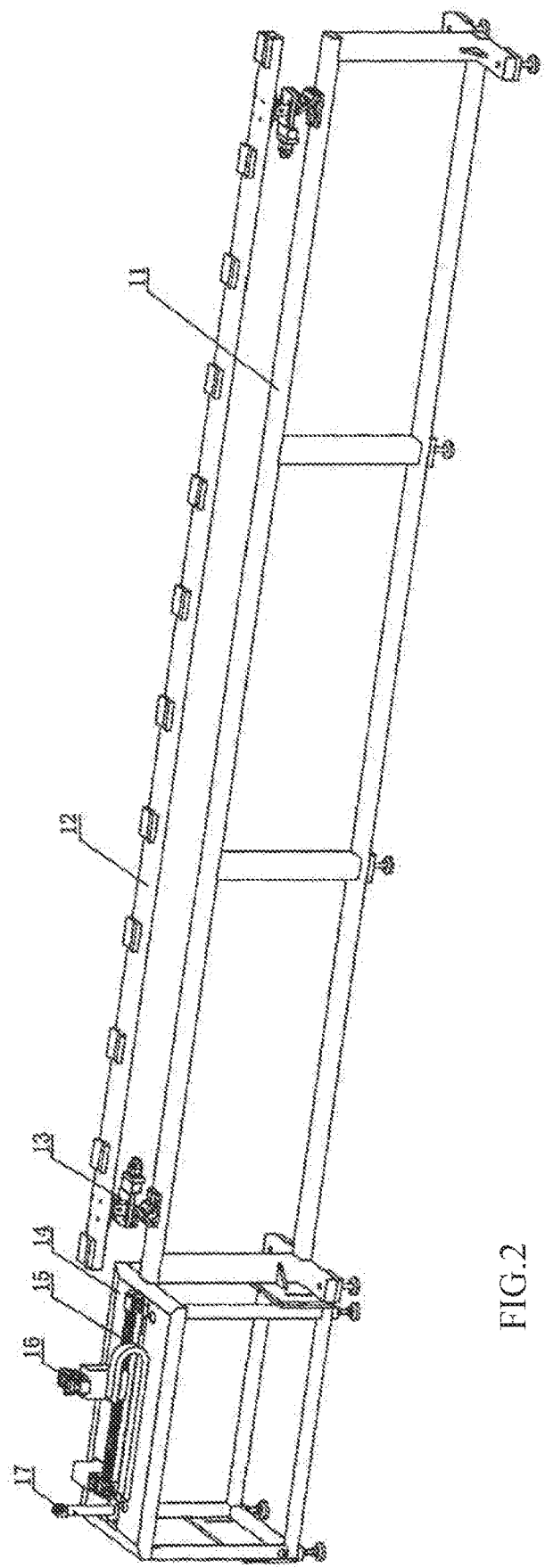
FIG. 2 is a structure diagram of an automatic clamping input mechanism.

As shown in FIG. 2, a height adjusting mechanism 13 is mounted on each end of the loading rack frame 11 of the automatic clamping input mechanism 1, wherein a loading rack 12 is disposed above the height adjusting mechanism 13, and the centering of the material to be detected with different diameters can be realized through the height adjusting mechanism 13; the loading rack 12 is provided with multiple PTFE V-shaped grooves (supporting portions) to ensure the stability during the loading process of the material to be detected; the left side of the loading rack frame 11 is connected with a bottom of an automatic loading mechanism frame 14 through a connecting plate and a fastening screw, wherein the automatic loading mechanism frame 14 is provided with a loading moving unit 15, wherein the loading moving unit 15 consists of a stepping motor and a toothed belt to form a linear moving unit, wherein its two ends are provided with anti-collision blocks to ensure the safety of the moving process, wherein a movable sliding block is disposed on its upper part, and the sliding block is connected with a loading clamping mechanism 16; the loading clamping mechanism 16 comprises an air claw and a clamping module connected to the air claw, wherein both ends of the clamping module are connected with L-shaped stoppers, which can support the material to be detected when the air claw is opened; the loading centering device 17 is located between the loading moving unit 15 and the entrance of the ultrasonic detector 3 to ensure the centering of the material to be detected and the ultrasonic detector 3.

Figure 3:
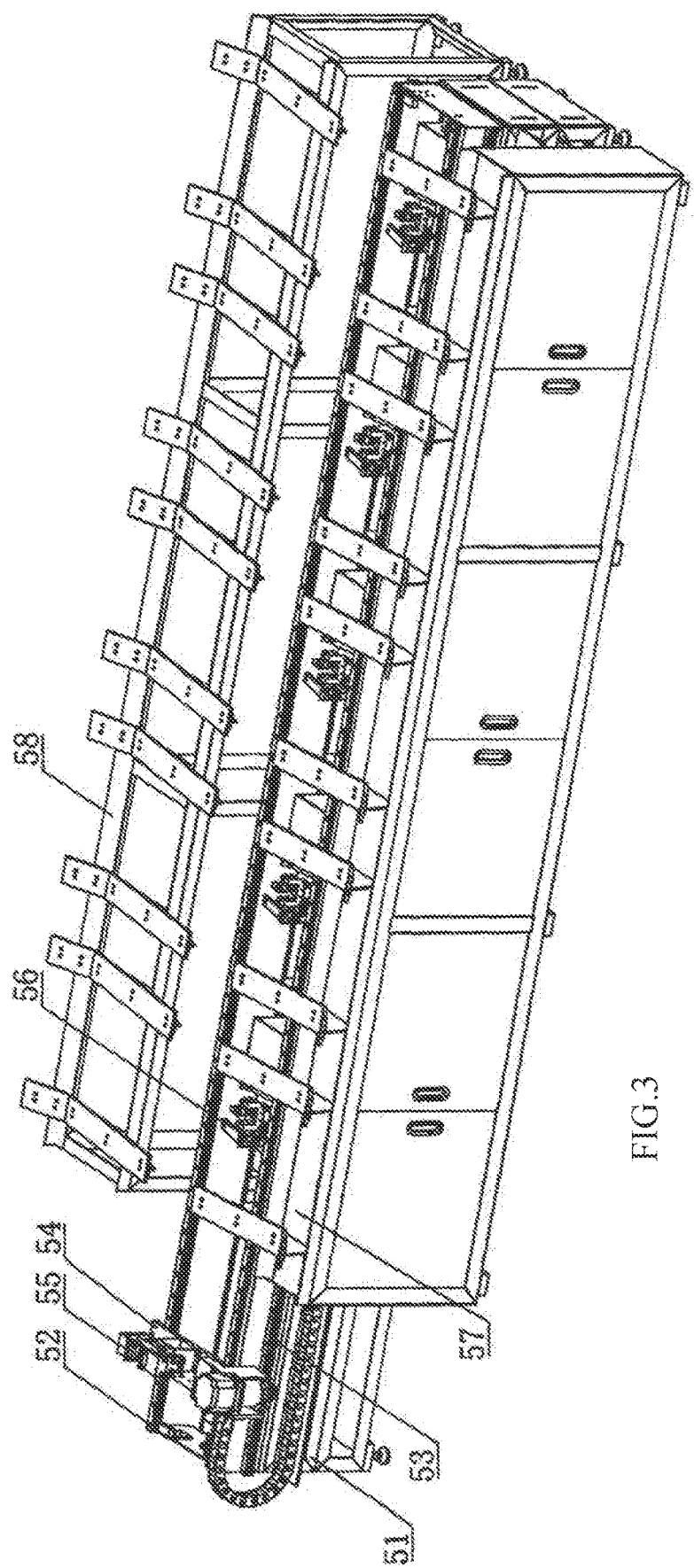
FIG. 3 is a structure diagram of a traction output sorting mechanism.

As shown in FIG. 3, the traction output sorting mechanism 5 is provided with a discharging mechanism frame 51, wherein the discharging mechanism frame 51 is provided with a discharging mechanism guide rail 52, and the outer side is provided with a discharging mechanism toothed rack 53, a discharging moving unit 54 and a discharging clamping mechanism 55, wherein the discharging moving unit 54 is connected to discharging mechanism guide rail 52 through a sliding block, wherein a moving motor shaft of the discharging moving unit 54 is connected with a gear, and the precise displacement of the discharging moving unit 54 is realized through the meshing transmission of the gear and the toothed rack, wherein the discharging clamping mechanism 55 is provided with a clamping air claw and a clamping module connected with the clamping air claw, which are used for clamping and towing the material to be detected during the discharging process; a plurality of supporting sorting mechanisms 56 are disposed inside the discharging mechanism frame 51, and the supporting sorting mechanisms 56 are raised successively during the detecting process to fix and support the material to be detected, wherein the lifting amount of the supporting sorting mechanism 56 is related to the length of the material to be detected; after the material to be detected are completely out of the detecting unit, according to the defects of the material to be detected, the supporting sorting mechanism 56 completes the automatic sorting; the front of the discharging mechanism frame 51 is connected with a discharging unqualified area rack, and the rear is connected with a discharging qualified area rack 58, to place qualified and unqualified material to be detected after sorting.

Figure 4:
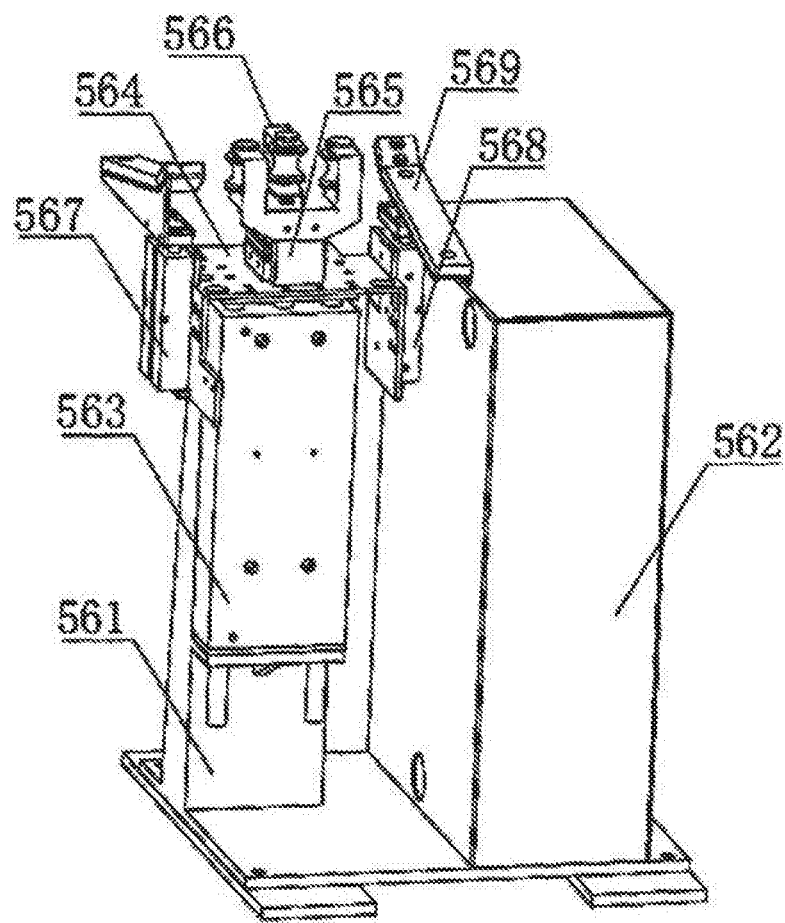
FIG. 4 is a structure diagram of a supporting sorting mechanism.

As shown in FIG. 4, the traction output sorting mechanism 5 is provided with five supporting sorting mechanisms 56, wherein each supporting sorting mechanism 56 comprises a supporting sorting mechanism frame 561, a supporting sorting mechanism control box 562, a lifting mechanism cylinder 563, a lifting bracket 564, a clamping cylinder 565, a clamping mechanism 566, a qualified sorting cylinder 567, an unqualified sorting cylinder 568 and a sorting pallet 569.

Wherein, the bottom of the supporting sorting mechanism frame 561 is fixed to the discharging mechanism frame 51 by fastening screws, and the supporting sorting mechanism frame 561 is provided with the supporting sorting mechanism control box 562 and the lifting mechanism cylinder 563, wherein the supporting sorting mechanism control box 562 is provided with programmable controllers for cylinder controlling, solenoid valves, pressure regulating valves, etc. inside, wherein the U-shaped lifting bracket 564 is connected in the telescopic direction of the lifting mechanism cylinder 563, during the discharging process of the material to be detected, the lifting bracket 564 realizes raising and dropping actions under the control of the lifting mechanism cylinder 563. The clamping cylinder 565 and the clamping mechanism 566 are connected above the lifting bracket 564, and the clamping mechanism 566 consists of a bracket and three rollers arranged parallel to each other, which supports and centers the material to be detected during the detecting process; the clamping and opening actions of the clamping mechanism 566 for the material to be detected are completed by the expansion and contraction of the clamping cylinder 565 to ensure that the center of the material to be detected is always in a straight line during the discharging process.

Both sides of the lifting bracket 564 are respectively provided with the qualified sorting cylinder 567 and the unqualified sorting cylinder 568, and the lifting and sorting of the material to be detected are completed by the telescopic action of the qualified and unqualified cylinders. The qualified sorting cylinder 567 and the unqualified sorting cylinder 568 are respectively connected with one "L-shaped" sorting pallet 569, which is used for sorting qualified and unqualified material to be detected, wherein the two sorting pallets 569 are mounted in a mirror image, when they are raised at the same time, they can support and fix the material to be detected, and the long edge of the sorting pallet 569 is at a certain angle to the horizontal, so that when it is raised on a single side, the material to be detected can naturally slide down onto the corresponding rack.

During the movement of the material to be detected, the lifting bracket 564 of each supporting sorting mechanism 56 are lifted up successively. Before sorting, the clamping mechanism 566 is in a clamping state. After the material to be detected stops moving, it enters the sorting stage. First, the clamping mechanism 566 is opened, and then the qualified sorting cylinder 567 and the unqualified sorting cylinder 568 are raised at the same time, and the material to be detected is lifted to a height higher than the discharging rack, and then according to the qualified or unqualified condition of the material to be detected, the qualified sorting cylinder 567 or the unqualified sorting cylinder 568 will drop down, and the material to be detected will automatically slide down onto the corresponding rack. When the detected material is completely dropped on the discharging area rack, the lifting bracket is lowered, and the qualified sorting cylinder 567 and the unqualified sorting cylinder 568 in the raised state at the same time also drop, so that a sorting process is completed.

Embodiment 7

The difference from Embodiment 6 is that the sorting pallet 569 consists of two or more sorting pallets mounted side by side, and other parts and expected results are the same as Embodiment 7.

Embodiment 8

Compared with the linear transmission method of the material to be detected, the spiral transmission method of the material to be detected can rely on the rotation of the material to be detected to achieve 100% coverage of the material to be detected by the acoustic beam According to actual needs, one or more probes of the outer ring can be flexibly arranged along the axial or circumferential direction, and the inner core—the acoustic eyes are correspondingly arranged along the axial or circumferential direction, so as to realize the detection of the spiral transmission mode without blind area.

Embodiment 9

For material to be detected with different detecting methods, the detectors can be selected flexibly according to needs. For example, the detector can be replaced by a detector mounted with an eddy current probe to realize automatic eddy current detecting for the material to be detected. Using the ultrasonic detector and the eddy current detector at the same time can realize the automatic ultrasonic detection and automatic eddy current detection of the material to be detected in the same device.

Embodiment 10

According to the material and length range of the material to be detected, the length of the loading mechanism frame 14 and the discharging mechanism frame 51 can be flexibly adjusted, and the number of the supporting sorting mechanism 56 can be increased or reduced, and the separation distance of the supporting sorting mechanism 56 can be increased or reduced.

The above embodiments are only for illustrating technical ideas and features of the present invention, and are intended to enable those skilled in the art to understand and implement the contents of the present invention, and are not intended to limit the scope of the protection of the present invention. Any equivalent changes or modifications made according to the spirit of the present invention shall be covered within the scope of the protection of the present invention.

What is claimed is:

1. An ultrasonic detector, comprising:
a water storage device;
a sealing cover provided on the water storage device for sealing the water storage device;
an annular array unit mounting rack;
an annular array detecting unit; and
a sensor mounted at an outside of the sealing cover for determining the positions of the head portion and the tail portion of the material to be detected, wherein the annular array unit mounting rack are fixed inside the water storage device and the annular array detecting unit is connected to the annular array unit mounting rack, wherein the annular array detecting unit comprises an outer ring and an inner ring, wherein the outer ring and the inner ring are connected with each other to be a whole by a wire inlet side end cover and a wire outlet side end cover, wherein the outer ring comprises an outer ring substrate and a plurality of outer ring arraying probes, the inner ring has an inner ring inner core, wherein the outer ring substrate has a plurality of probe mounting holes and the outer ring arraying probes are provided in the probe mounting holes respectively, wherein the outer ring, the wire inlet side end cover and the wire outlet side end cover define a coupling water cavity passing through an inner hole of the outer ring substrate, wherein the inner ring inner core of the inner ring is disposed at a central portion of the coupling water cavity, wherein the inner ring inner core defines a plurality of through holes for allowing the ultrasonic beam to pass through to arrive at the material to be detected and has a cylindrical inner hole which defines a moving channel for the material to be detected, wherein the through holes of the inner ring inner core are arranged along an outer cylindrical surface thereof and aligned with the probe mounting holes respectively.

2. The ultrasonic detector, as recited in claim 1, wherein the probe mounting holes are arranged to define a circular array surrounding the inner ring inner core.

3. The ultrasonic detector, as recited in claim 1, wherein the probe mounting holes are arranged to define a plurality of circular arrays surrounding the inner ring inner core respectively.

4. The ultrasonic detector, as recited in claim 1, wherein the inner ring inner core further defines a plurality of passages for discharging the gas in the moving channel, wherein the passages are provided in a wall of the inner ring inner core.

5. The ultrasonic detector, as recited in claim 1, wherein the inner ring further comprises an inner ring inner core locking ring, wherein the inner ring inner core is a cylindrical member and passes through a center hole of the wire inlet side end cover and a center hole of the wire outlet side end cover, wherein the inner ring inner core is locked at the wire inlet side end cover by the inner ring inner core locking ring.

6. The ultrasonic detector, as recited in claim 2, wherein the inner ring further comprises an inner ring inner core locking ring, wherein the inner ring inner core is a cylindrical member and passes through a center hole of the wire inlet side end cover and a center hole of the wire outlet side end cover, wherein the inner ring inner core is locked at the wire inlet side end cover by the inner ring inner core locking ring.

7. The ultrasonic detector, as recited in claim 3, wherein the inner ring further comprises an inner ring inner core locking ring, wherein the inner ring inner core is a cylindrical member and passes through a center hole of the wire inlet side end cover and a center hole of the wire outlet side end cover, wherein the inner ring inner core is locked at the wire inlet side end cover by the inner ring inner core locking ring.

8. The ultrasonic detector, as recited in claim 1, wherein the outer ring substrate is made of organic glass material, and the inner ring inner core is made of polytetrafluoroethylene.

9. The ultrasonic detector, as recited in claim 2, wherein the outer ring substrate is made of organic glass material, and the inner ring inner core is made of copper.

10. The ultrasonic detector, as recited in claim 3, wherein the outer ring substrate is made of organic glass material, and the inner ring inner core is made of stainless steel.

11. An ultrasonic detecting system, comprising:
an ultrasonic detector;
an ultrasonic signal processing unit;
an operation control platform for carrying the ultrasonic detector and the ultrasonic signal processing unit thereon;
an automatic clamping input mechanism for feeding the material to be detected into the ultrasonic detector;
a traction out put sorting mechanism for driving the material to be detected through and out of the ultrasonic detector, wherein the automatic clamping input mechanism and the traction output sorting mechanism are connected with both sides of the operation control platform respectively;
wherein the ultrasonic detector comprises a water storage device, a sealing cover provided on the water storage device for sealing the water storage device, an annular array unit mounting rack, an annular array detecting unit and a sensor mounted at an outside of the sealing cover for determining the positions of the head portion and the tail portion of the material to be detected, wherein the annular array unit mounting rack are fixed inside the water storage device and the annular array detecting unit is connected to the annular array unit mounting rack, wherein the annular array detecting unit comprises an outer ring and an inner ring, wherein the outer ring and the inner ring are connected with each other to be a whole by a wire inlet side end cover and a wire outlet side end cover, wherein the outer ring comprises an outer ring substrate and a plurality of outer ring arraying probes, the inner ring has an inner ring inner core, wherein the outer ring substrate has a plurality of probe mounting holes and the outer ring arraying probes are provided in the probe mounting holes respectively, wherein the outer ring, the wire inlet side end cover and the wire outlet side end cover define a coupling water cavity passing through an inner hole of the outer ring substrate, wherein the inner ring inner core of the inner ring is disposed at a central portion of the coupling water cavity, wherein the inner ring inner core defines a plurality of through holes for allowing the ultrasonic beam to pass through to arrive at the material to be detected and has a cylindrical inner hole which defines a moving channel for the material to be detected, wherein the through holes of the inner ring inner core are arranged along an outer cylindrical surface thereof and aligned with the probe mounting holes respectively.

12. The ultrasonic detecting system, as recited in claim 11, wherein the probe mounting holes are arranged to define a circular array surrounding the inner ring inner core.

13. The ultrasonic detecting system, as recited in claim 11, wherein the probe mounting holes are arranged to define a plurality of circular arrays surrounding the inner ring inner core respectively.

14. The ultrasonic detecting system, as recited in claim 11, wherein the inner ring inner core further defines a plurality of passages for discharging the gas in the moving channel, wherein the passages are provided in a wall of the inner ring inner core.

15. The ultrasonic detecting system, as recited in claim 11, wherein the inner ring further comprises an inner ring inner core locking ring, wherein the inner ring inner core is a cylindrical member and passes through a center hole of the wire inlet side end cover and a center hole of the wire outlet side end cover, wherein the inner ring inner core is locked at the wire inlet side end cover by the inner ring inner core locking ring.

16. An ultrasonic detecting system, comprising:
an ultrasonic detector;
an ultrasonic signal processing unit;
an operation control platform for carrying the ultrasonic detector and the ultrasonic signal processing unit thereon;
an automatic clamping input mechanism for feeding the material to be detected into the ultrasonic detector;
a traction output sorting mechanism for driving the material to be detected through and out of the ultrasonic detector, wherein the automatic clamping input mechanism and the traction output sorting mechanism are connected with both sides of the operation control platform respectively;
wherein the automatic clamping input mechanism comprises a loading rack frame, an automatic loading mechanism frame and a loading rack disposed above the loading rack frame through a height adjusting mechanism, wherein the loading rack comprises one or more supporting portions for supporting the material to be detected, wherein the automatic loading mechanism frame is located on the left side of the loading rack frame, and a loading moving unit and a loading centering device are provided with the automatic loading mechanism frame, wherein a loading clamping mechanism is disposed on the loading moving unit for clamping the material to be detected, wherein the loading moving unit can drive the loading clamping mechanism to move horizontally, wherein the traction output sorting mechanism comprises a discharging mechanism frame and a supporting sorting mechanism, wherein the discharging mechanism frame is provided with a discharging traction mechanism and a discharging clamping mechanism, wherein the discharging traction mechanism is disposed on the discharging mechanism frame for driving the discharging clamping mechanism to move horizontally, wherein a plurality of supporting sorting mechanisms are disposed on the discharging mechanism frame for supporting and automatic sorting of the material to be detected during the detecting process, wherein a discharging unqualified area rack and a discharging qualified area rack is provided at both sides of the discharging mechanism frame respectively.

17. The ultrasonic detecting system, as recited in claim 16, wherein the supporting sorting mechanism comprises a supporting sorting mechanism frame, a supporting sorting mechanism control box, a lifting mechanism cylinder, a lifting bracket, a clamping cylinder, a clamping mechanism, a qualified sorting cylinder, an unqualified sorting cylinder and a sorting pallet, wherein the supporting sorting mechanism frame is connected to the discharging mechanism frame, the supporting sorting mechanism control box is provided at one side of the supporting sorting mechanism frame, and the lifting mechanism cylinder is provided at another side of the supporting sorting mechanism frame, wherein the lifting bracket is connected in the telescopic direction of the lifting mechanism cylinder, the clamping cylinder and the clamping mechanism are connected above the lifting bracket, and the clamping mechanism comprises a bracket and three rollers, the qualified sorting cylinder and the unqualified sorting cylinder are provided at both sides of the lifting bracket respectively, wherein the qualified sorting cylinder and the unqualified sorting cylinder are respectively connected with one "L-shaped" sorting pallet.

18. The ultrasonic detecting system, as recited in claim 17, wherein the discharging traction mechanism comprises a discharging mechanism guide rail, a discharging mechanism toothed rack and a discharging moving unit, wherein the discharging mechanism guide rail is laid on the discharging mechanism frame, wherein the discharging moving unit is disposed on the discharging mechanism guide rail and is driven to move by the discharging mechanism toothed rack, wherein the discharging clamping mechanism is disposed on the discharging moving unit.

19. The ultrasonic detecting system, as recited in claim 18, wherein the outer ring substrate is made of organic glass material, and the inner ring inner core is made of polytetrafluoroethylene.

* * * * *